Figure 11:
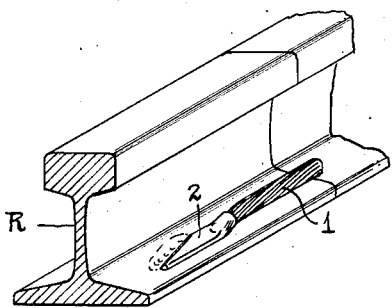

April 5, 1932.  C. A. CADWELL  1,852,694
RAIL BONDING
Filed Nov. 25, 1925  2 Sheets-Sheet 1
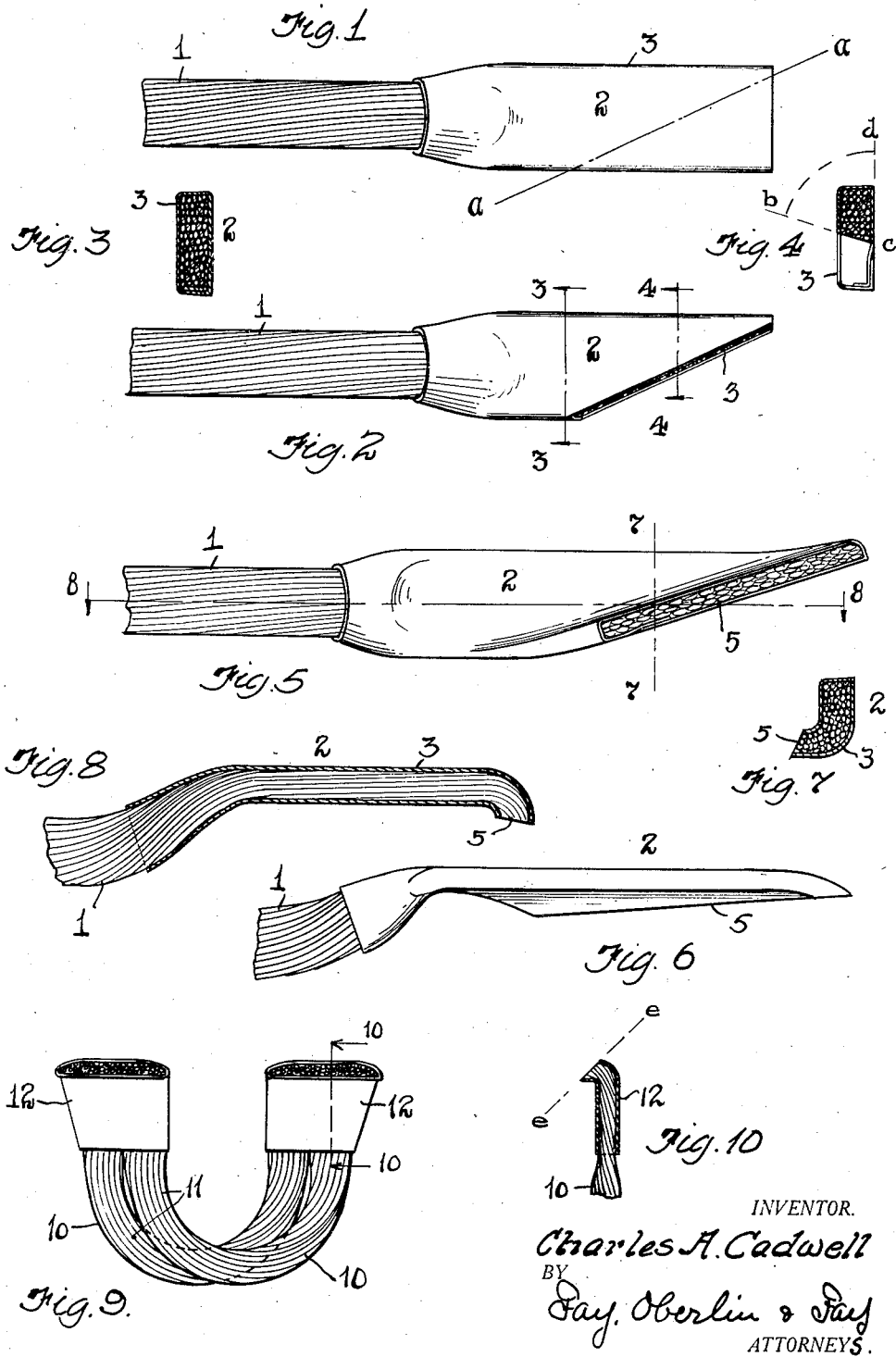

April 5, 1932.  C. A. CADWELL  1,852,694
RAIL BONDING
Filed Nov. 25, 1925   2 Sheets-Sheet 2

INVENTOR.
Charles A. Cadwell
BY
Fay, Oberlin & Fay
ATTORNEYS.

Patented Apr. 5, 1932

1,852,694

UNITED STATES PATENT OFFICE

CHARLES A. CADWELL, OF CLEVELAND HEIGHTS, OHIO, ASSIGNOR TO THE ELECTRIC RAILWAY IMPROVEMENT COMPANY, OF CLEVELAND, OHIO, A CORPORATION OF OHIO

RAIL BONDING

Application filed November 25, 1925. Serial No. 71,378.

The welding of copper to steel for the purpose of rail bonding was first done by the cast weld process in which superheated molten copper was poured into a mold against the surface of the rail and around the end of the copper conductor. Experience proved that only where the hot metal impinged upon the surface of the rail in such a manner as to break rather than merely deflect the stream, would there be a welding of the copper to the steel, this regardless of the temperature of the metal poured. Similarly, in arc welding where the molten metal is supplied from a copper electrode, and in fact in all metallic arc welding, the transfer of the molten drops of metal from the pencil to the work or weld must be made at the precise point to which the electric arc is sprung if a molecular weld of this drop to the work is to be had.

In the method of electric arc welding just referred to, the arc has a tendency to center on the hottest part of the work and since steel is of relatively slow heat conductivity, the surface of the rail attains a high temperature instantly and so attracts the arc, while on the other hand, the copper of the bond is relatively cold and slower to attract such arc. It is consequently difficult to run a V-seam between a copper and a steel body, as for example the terminal of a copper bond and a steel rail, with a copper pencil, i. e. to lay a string of metal in the angle between two such surfaces lying at approximately right angles to each other where the one surface is steel and the other is copper. If the vertical surface be of steel and the horizontal one of copper, for instance, the arc flame will center on the steel and hot drops of copper will fall on the copper surface and chill without welding; while if the surfaces be reversed in position, the molten copper will weld to the steel but will be chilled against the vertical copper surface, unless this surface be but an edge of such thinness that the heat of the adjacent arc flame, together with that of the molten copper which falls in drops, is sufficient to produce the weld.

The foregoing observations apply not only to the case where the copper pencil constitutes an electrode from which the arc is sprung, but also to the alternative procedure in which a carbon electrode is employed and the end of the copper pencil (not included in the electric circuit) is gradually melted off by being inserted in the arc. Such observations likewise apply to the method of welding with a gas flame where a copper pencil is melted in such a flame in the same fashion as in the electric arc.

With the object of facilitating a welding operation of the type described and insure the production of an adequate bond by securing a homogeneous juncture between the bond terminal and the rail, or equivalent metal bodies, I make such bond terminal of the special form and construction hereinafter fully described and particularly pointed out in the claims, the annexed drawings and the following description setting forth in detail certain steps and means embodying the invention, such disclosed steps and means constituting, however, but several of the various ways in which the principle of the invention may be used.

In said annexed drawings:—

Figure 12:
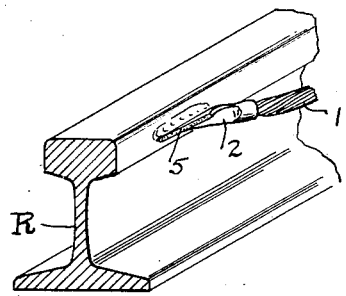
Figure 13:
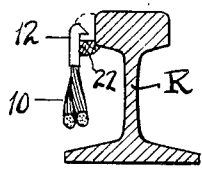
Figure 14:
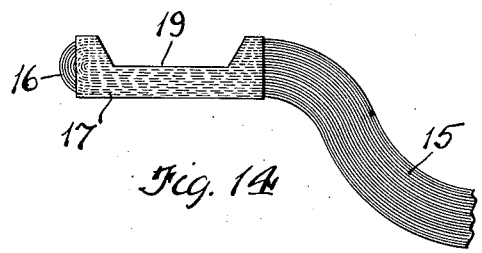
Figure 15:
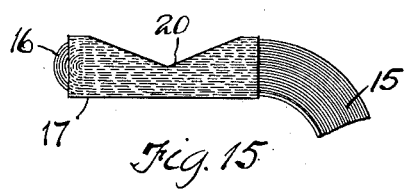

Fig. 1 is a plan view of one form of my improved rail bond terminal at an intermediate stage in its manufacture; Fig. 2 is a similar view of such terminal as completed; Figs. 3 and 4 are transverse sections of such completed terminal, the latter figure being somewhat conventionalized for clarity, the planes of the sections being indicated by the lines 3—3 and 4—4, respectively, Fig. 2; Fig. 5 is a view similar to that of Fig. 2 but showing a modified form of terminal; Fig. 6 is a side elevational view of such modified form, as viewed from above in Fig. 5; Fig. 7 is a transverse section and Fig. 8 a longitudinal section of such modified form, the planes of the sections being indicated by the lines 7—7 and 8—8, Fig. 5; Fig. 9 is a front elevation of a different type of bond showing still another form of terminal; Fig. 10 is a transverse section of such terminal, the plane of the section being indicated by the line 10—10, Fig. 9; Figs. 11, 12 and 13 are diagrammatic perspective views illustrating the method of application to the rail of bonds having terminals of the three different modified forms illustrated in Figs. 2, 5 and 9, respectively; and Figs. 14 and 15 are side elevations of a bond of yet another type with two differently modified forms of terminal embodying my present improved construction.

As hereinbefore indicated, in order to weld a copper conductor to the horizontal face of a steel rail by means of a copper arc pencil, I have found that the face of the conductor terminal, which is presented for welding, had best be but an edge of such thinness that the heat of the adjacent arc flame which is sprung from the face of the steel, together with that of the molten copper which falls in drops, is sufficient to produce simultaneously with the weld of a drop to the steel a weld of that same drop of copper to the edge of the copper conductor. Only if such conditions obtain can a complete weld between every wire or lamination of the conductor and the weld metal be secured.

Referring to Figs. 1 to 4, inclusive, the bond there illustrated is of the general type in which the conductor body 1 is formed from a stranded cable. The terminal 2, which is designed to be welded to the rail, is formed by first sheathing the corresponding end of such cable in a thin sheet 3 of copper in order to give form to such terminal and strength against vibration and shock when the bond is welded to the rail.

The terminal including such sheath or sleeve 3 and the portions of the strands of the body that enter therein, is then flattened by means of a suitable die under a hammer or press so that such strand portions are left in tightly compressed condition, as shown in Figs. 3 and 4. The flattening of the terminal is graduated at its inner end, as shown in Figs. 1 and 2, the sleeve 3 being left in its original approximately circular form at such end so that the entering strands may have a slight amount of relative movement at the point in question.

The bond is finished by shearing the terminal 2 on a line such as the line a—a, Fig. 1, at an angle to the median line of the terminal and preferably also at an angle to the plane of such terminal. As a result, the end of the strands of the conductor body that enter into the terminal are of course individually sheared at a corresponding angle and so present for welding an increased area of contact over that presented by a normal section of the flattened terminal. By varying the angle of inclination of the shear cut a—a, the amount of increase in such area of contact may be correspondingly varied, the preferred angle being the one that will give the prescribed ratio of contact weld between the copper of the conductor and the steel of the rail.

At the same time that the area of contact of the individual strands is thus increased by inclining the cut at an angle to the plane of the terminal, the edge of the latter is formed into an acute angle b—c—d, as shown in Fig. 4, thus presenting a more or less sharply defined edge upon which to play the arc.

In Fig. 4 a portion of the exposed conductors has not been shown in end elevation in order that the angle of cut may be more clearly illustrated.

In order to render such edge still more effective, the portion of the terminal adjacent the cut a—a may be bodily bent out of the plane of the terminal so that when the terminal is laid on the flat surface of a rail, the whole edge 5 will stand slightly above or clear from such surface (Fig. 5). This last mentioned form of terminal is further illustrated in Figs. 6, 7 and 8, which clearly illustrate the manner in which the terminal is twisted or formed in order thus to offset the angularly cut welding edge of the terminal.

In Figs. 9 and 10 still another type of bond is shown, the body 10 whereof, although composed as before of stranded cable, is of U-shape. Such body is shown as comprising twin cables 11, but one or more may be employed as found desirable. As before, the respective ends of the stranded conductor body enter in sleeves 12 which are flattened in order tightly to compress the strand portions in question. These terminals are thereupon cut at an angle e—e (see Fig. 10) that serves to increase the area of contact over a normal section and, as before, the portion of the terminal adjacent such edge is bodily bent or twisted so as to offset such angularly inclined welding edge.

The first of the foregoing types of bond shown in its finished form in Fig. 2 is designed for application to the top of the base of a rail either for bonding round joints, bonding special work or for cross bonding, and in Fig. 11 such bond is shown as thus attached to a rail R. The second type of bond shown in Figs. 5 and 6 is designed more especially for bonding against the vertical surface of a rail as on the head or web of a girder rail, one illustrative mode of application of such bond being shown in Fig. 12. The third type of bond shown in Fig. 9, like the preceding type, is designed for application laterally to the rail, one thereof being shown in Fig. 13.

While the conductor body of each of the three types of bond hereinbefore referred to is shown as composed of a stranded cable in which the strands particularly as they enter the flattened terminal lie approximately parallel with each other, the improvement, consisting in forming the welding edge of such terminal at an angle to the strands which thus enter therein, may also be advantageously used with the so-called laminated type of bond. For the purpose of this specification, the term "strand" may be understood as denoting either a cable strand, as found in such first three types of bond, or the lamination of such last mentioned type, or for that matter a single, solid strand or bar may compose the body of the bond.

As is well known, in the manufacture of such laminated type of bond, a continuous strip of flat wire copper of prescribed width is wound and formed to present a body 15 of general U form, as shown in Fig. 14, with oppositely directed terminals 16. In the present improved construction, such terminals are sheathed with thin sheets 17 of copper after which they are notched out for welding as shown. As a result of the foregoing, it will be seen that the end of every lamination forming the body of the bond is accessible for edge welding within such notch 19. In other words, upon springing the arc at the bottom of the notch, the flame will at once center on the steel and hot drops of copper will fill the V-seam, welding to the rail or lying chilled in the bottom of the notch which is formed by the uncut superposed laminations. A point of importance in regard to this detail is the fact that these superposed laminations so retard the flow of heat from one to another that there is never any danger of melting through even though the uppermost one, that is directly exposed to the arc and molten copper, may be melted. As the arc pencil, centered on the steel, is moved toward the side of the notch, it readily brings the exposed cut ends of the laminations to a welding temperature, with the result that a perfect union is secured between every lamination and the metal of the weld as well as between the latter and the rail. As in the case of the angularly cut terminals of the stranded cable types of bond, so with such laminated bond, the form of the notch may be varied to give any desired ratio of contact area between conductor and rail, the exact form depending on the width of the lamination, capacity of bond and ratio of contact specified. Thus, for example, as shown in Fig. 15, the notch 20 may be a V notch, the sides of which meet each other, instead of a notch with a flat bottom, such as illustrated in Fig. 14.

The increased effectiveness achieved by the use of my improved form of bond terminal in each of the several forms illustrated is due to the fact that the sectional area of the portion of the conductor body that enters into such terminal has been enlarged. The advantages flowing from this construction are particularly noticeable where the terminal requires to be welded against a limited portion of the rail face, as for example against the head as illustrated in Figs. 12 and 13. Such advantages, furthermore, may be augmented by the arrangement illustrated in Fig. 13, consisting in the utilization or provision of a dam 22, such as a suitably shaped block of refractory non-conducting material, e. g. carbon, between the terminal and the lower edge of the rail head, the effect of such dam being two fold, firstly to space the inclined edge of the terminal out of contact with the juxtaposed surface of the rail head, and secondly to form a closure adjacent the bottom edge of the terminal which prevents molten metal from dropping through. After the bond has been placed in position on the rail, as shown, the flame for welding is directed not on the bond but on the rail at the lowest point exposed within the space between the bond and rail. Copper is then added as the flame is continued, the molten metal first added settling and adhering to the very lowest part of the exposed rail surface and the space between the bond terminal and rail being thereupon built up by applying the flame to the rail and adding copper. If found desirable, the ends of the space in question may be closed or dammed in the same fashion as the bottom of such space. When the level of the molten metal reaches the lower edge of the inclined or angularly cut extremity of the terminal, the latter is easily united to the rising column of hot metal as is also the whole of such inclined or diagonally cut extremity.

Whatever may be the particular arrangement of terminal or method of application employed, such terminal where constructed in the manner hereinbefore set forth avoids the well known characteristic of flame weld type bonds as heretofore utilized, viz., that of giving the rail contact only along the line at the top of the weld. In other words, as heretofore constructed and applied, in bonds of the type in question, at the best the cross-sectional area of the conductor is brought abruptly into the weld metal of the terminal and is continued through this medium to the rail without enlargement to meet the lesser conductivity of the weld medium and especially that of the rail; while as a matter of fact, more frequently the effective cross-sectional area is reduced incidentally to the application of the bond to the rail, except where some special provision is made as by attaching to the end of the conductor a shelf to support additional molten metal (copper) and give the necessary contact area with the rail. In contradistinction to the foregoing, not only is my improved form of terminal much more simple and less expensive to manufacture, but it provides an even more effective way to obtain the desired increase of contact area than where a special terminal is formed by upsetting or forging the end of the conductor, or by welding thereto a steel body as in prevailing commercial practice.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. As an article of manufacture, a rail bond having a stranded conductor body, and an elongated flattened terminal wherein the strands of said body enter in tightly compressed and approximately parallel relation, the ends of such strands being exposed and on a bevel and the terminal being bodily bent out of its plane adjacent the edge of such bevel.

2. A method of forming a terminal on a rail-bond having a stranded metallic conductor body, which comprises surrounding the end of the body with a metal sheath, flattening the sheath and compressing the portions of the strands therein, then cutting the same at an angle to the median line and to the plane of the terminal, and bodily bending such terminal out of such plane adjacent the cut.

3. As an article of manufacture, a rail bond having a stranded metallic conductor body, and an elongated flattened terminal, having a rail engaging face the strands of said body entering said terminal in tightly compressed and approximately parallel relation, such flattened terminal with included strands being cut off at an angle inclined to the median line of the terminal so as correspondingly to increase the length of weld line and area of the exposed ends of such strands, the plane of said cut being normal to that of said face, and the thickness of said terminal being less than that of said conductor body.

4. As an article of manufacture, a rail bond having a stranded metallic conductor body, and an elongated flattened terminal wherein the strands of said body enter in tightly compressed deformed and approximately parallel relation, such flattened terminal with included strands being cut off at an angle, the plane of said cut being inclined to the median line, parallel to the longest side of said flattened terminal, at other than a right angle, and the plane of said cut being also inclined to a plane perpendicular to the plane of such terminal so as correspondingly to increase the area of the exposed ends of such strands, the thickness of said terminal being less than that of said conductor body.

5. A method of forming a terminal on a rail bond having a stranded metallic conductor body, which comprises surrounding the end of the body with a metal sheath, flattening the sheath and compressing and flattening the portions of the strands therein, then cutting such terminal at an angle to the median line thereof whereby the area of the exposed ends of such strands is correspondingly increased.

6. A method of forming a terminal on a rail bond having a stranded metallic conductor body, which comprises surrounding the end of the body with a metal sheath, flattening the sheath and compressing and flattening the portions of the strands therein, then cutting such terminal both at an angle to the median line and to the plane of the terminal whereby the area of the exposed ends of such strands is correspondingly increased.

Signed by me, this 20th day of November, 1925.

CHARLES A. CADWELL.